US010065165B2

(12) United States Patent
Darcissac et al.

(10) Patent No.: US 10,065,165 B2
(45) Date of Patent: Sep. 4, 2018

(54) METHOD FOR COMPLETELY EMPTYING A CATALYTIC REACTOR

(71) Applicant: Eurecat S.A, La Voulte-sur-Rhône (FR)

(72) Inventors: Jean Darcissac, Saint Georges les Bains (FR); Vincent Thevenet, Allex (FR); Romain Vial, Vernaison (FR); Lilian Bernard, Montelimar (FR); Pierre Dufresne, Aouste sur Sye (FR)

(73) Assignee: Eurecat S.A., La Voulte-sur-Rhône (FR)

( * ) Notice: Subject to any disclaimer, the term of this patent is extended or adjusted under 35 U.S.C. 154(b) by 98 days.

(21) Appl. No.: 15/184,562

(22) Filed: Jun. 16, 2016

(65) Prior Publication Data

US 2016/0375418 A1 Dec. 29, 2016

(30) Foreign Application Priority Data

Jun. 26, 2015 (FR) ...................... 15 55945

(51) Int. Cl.
*B65G 69/08* (2006.01)
*B01J 8/00* (2006.01)

(52) U.S. Cl.
CPC .............. *B01J 8/003* (2013.01); *B01J 8/002* (2013.01); *B01J 8/0015* (2013.01); *B65G 69/08* (2013.01);
(Continued)

(58) Field of Classification Search
CPC .. B01J 8/002; B65G 69/08; B65G 2814/0217; B65G 2814/0223; B08B 9/0808; B08B 9/087; B65D 90/0093
(Continued)

(56) References Cited

U.S. PATENT DOCUMENTS 745,642 A * 12/1903 Miller ...................... F23L 1/00
15/104.16
1,550,311 A * 8/1925 Foster ................... B65G 53/00
414/313
(Continued)

FOREIGN PATENT DOCUMENTS

WO    199420396 A1    9/1994
WO    2004058572 A1    7/2004

OTHER PUBLICATIONS

French Search Report issued in French Application No. 1555945, filed Jun. 26, 2015.

*Primary Examiner* — James W Keenan
(74) *Attorney, Agent, or Firm* — Saul Ewing Arnstein & Lehr LLP; Peter C. Lauro, Esq.

(57) ABSTRACT

The present invention provides a method for emptying a reactor containing at least one bed of spent catalyst particles, wherein the reactor comprises at least one dump tube that opens into the reactor. The method comprising the steps of:
(a) causing a portion of the bed of spent catalyst particles to flow out of the reactor via the dump tube; and
(b) extracting the remainder of the spent catalyst particles from the reactor by driving the remainder of the spent catalyst particles toward the opening of the dump tube using a removable device comprising at least one flexible extraction sleeve introduced into the reactor via the said dump tube and connected to an extraction system situated outside the reactor, the sleeve being provided on its external surface with protuberances and being able to move, inside the reactor, translationally and rotationally with respect to the dump tube.

16 Claims, 5 Drawing Sheets

(52) U.S. Cl.
CPC ............. *B01J 2208/00761* (2013.01); *B01J 2208/00769* (2013.01); *B65G 2814/0217* (2013.01)

(58) Field of Classification Search
USPC ........ 15/104.096, 104.16; 414/209, 314, 804
See application file for complete search history.

(56) References Cited

U.S. PATENT DOCUMENTS

| | | | | |
|---|---|---|---|---|
| 2,322,146 | A * | 6/1943 | Kuhn | C10B 33/006 15/104.096 |
| 4,509,701 | A * | 4/1985 | Jack | B08B 7/02 15/104.067 |
| 4,571,138 | A * | 2/1986 | Farajun | B08B 9/087 414/323 |
| 4,827,563 | A * | 5/1989 | Gordon | B08B 9/087 134/167 R |
| 5,987,683 | A * | 11/1999 | Leiman | B08B 9/00 15/104.16 |
| 6,016,585 | A * | 1/2000 | Allen | B08B 9/087 15/93.1 |
| 6,203,766 | B1 | 3/2001 | Kawakami et al. | |
| 7,434,601 | B2 * | 10/2008 | Kraus | B01J 8/0025 134/169 C |
| 7,959,870 | B2 | 6/2011 | Yanokuchi et al. | |
| 8,806,697 | B1 * | 8/2014 | Davila, Jr. | B08B 9/0808 15/246.5 |
| 9,468,957 | B1 * | 10/2016 | Al Shammari | B08B 9/087 |

\* cited by examiner

METHOD FOR COMPLETELY EMPTYING A CATALYTIC REACTOR

This application claims priority to French Application No. 1555945, filed Jun. 26, 2015. The entire content of the aforementioned patent application is incorporated herein by reference.

The subject of the present invention is a method that allows a reactor containing particles of catalyst to be emptied completely.

The method according to the invention is particularly suited to completely emptying an industrial reactor of the particles of spent catalyst that it contains.

Numerous industrial processes, notably in the fields of chemistry, petrochemistry and oil refinery, employ solid catalysts in the form of small-sized particles.

These catalyst particles are generally placed in the reactor in the form of one or more beds (or layers of catalyst) which are superposed and each deposited on a support tray.

As it is used in the reactor, the catalyst becomes gradually deactivated, and its activity decreases, so that it needs to be withdrawn from the reactor and replaced with fresh active catalyst. Thus, industrial reactors need to be shut down regularly in order to renew the bed or beds of catalyst. This operation is performed in two phases: the emptying of the reactor so as to remove the spent catalyst therefrom, followed by the recharging thereof with active catalyst. These two operations need to be performed as effectively and quickly as possible, so as to minimize reactor downtime, for obvious economic reasons.

Furthermore, the emptying operation needs to be complete, so that the entirety of the spent catalyst is eliminated in full from the reactor. This is because incomplete emptying would mean leaving some spent catalyst in the reactor, at the expense of active catalyst, something that would be particularly detrimental to the efficiency of the unit and that is, in practice, unacceptable.

However, completely emptying an industrial reactor of the spent catalyst particles it contains is an operation that, for various reasons, is tricky and problematic.

First of all, the spent catalyst particles have a tendency to be sticky and to agglomerate with one another fairly strongly, thereby making removing them from the reactor significantly more complicated.

Secondly, the spent catalyst often contains an active phase that may be reactive in contact with the air, such as, for example, active phases containing metal sulphides. Because of the presence of these compounds, the spent catalyst may spontaneously self-heat very suddenly and to a significant extent or even, in some cases, may self-ignite upon contact with the air. Most corresponding catalysts are classified, in accordance with a United Nations standard, either as self-heating or as pyrophoric.

Handling spent catalyst is therefore a tricky matter and may prove hazardous, and emptying the reactor is generally performed under an inert atmosphere (usually under nitrogen).

In order to empty a reactor containing spent particles of catalyst, there are a number of techniques known from the prior art:

Gravity flow emptying;

This is performed by opening the lateral dump tube or tubes situated at the bottom of the reactor (or the bottom of each catalyst bed in the case of a multi-bed reactor), so as to allow the catalyst to flow out of the reactor under the action of its weight. In the best cases this allows 80 to 85% of the spent catalyst contained in the reactor to be extracted.

However, the catalyst may also be sticky and not flow well if at all, notably when agglomerations of spent catalyst have formed. When that happens, it is necessary to resort to various techniques of unplugging the bed so as to cause the catalyst particles to start to flow.

In any case, even in the best scenarios, at the end of the gravity flow emptying operation a quantity of spent catalyst, which in general represents from 15 to 20 wt % of the initial bed of catalyst and which typically corresponds to the angle of repose of this divided solid, remains inside the reactor. The remainder of the catalyst inside the reactor at the end of the gravity flow emptying operation is commonly referred to as the "dig out".

Human intervention is then required in order to remove the dig out: an operator goes down inside the reactor and manually removes the remainder, for example using a shovel, to the dump tube. This operation is particularly hazardous: the reactor is under an atmosphere of nitrogen, given the self-heating nature of the spent catalyst, and fatal accidents regularly occur during these operations. There is therefore nowadays a desire within the industry to limit, if not to completely eliminate, such human interventions inside the reactors.

Suck-out emptying:

This is generally done from the top of the reactor. The top of the reactor is opened, under a purge of nitrogen, the charge distribution tray generally present above the bed is removed, and the catalytic bed is sucked out by means of an industrial extractor, compensated for with nitrogen.

The head of the extractor is generally guided by an operator in order to empty out the catalyst layer by layer. Solid and gas are separated via a cyclone. This widely used technique does have a number of disadvantages: high cost; damage to the catalyst particles sometimes going so far as meaning that these cannot be regenerated for later use; the presence of an operator inside the reactor, at least for the finishing operations, generating the same safety problems as those described hereinabove.

Examples of this type of technique are described in documents U.S. Pat. No. 7,959,870 and WO 2004/058572.

Wet gravity emptying:

This technique, which is somewhat experimental and less commonly used, makes it possible to avoid any human intervention in the reactor under an inert atmosphere. It consists in filling the reactor with water and in emptying the wet catalyst/water mixture via the lateral dump tubes situated at the bottom of the reactor.

However, it does have major disadvantages: it generates a great deal of dirty water and compromises the possibility of later regenerating the spent catalyst so that it can be reused.

There has therefore long been felt a significant need to have innovative solutions that will allow industrial reactors to be emptied completely, rapidly, effectively and reliably of the spent catalyst particles they contain.

The applicant company has now discovered a novel technique for emptying reactors containing spent catalyst particles that makes it possible to overcome the disadvantages of the methods of the prior art.

One subject of the present invention is a method for emptying a reactor containing at least one bed of spent catalyst particles and comprising at least one dump tube, which opens into the reactor at the bottom of the said bed of particles or underneath the latter. The method according to the invention comprises the following successive steps:

a first step consisting in causing a proportion of the bed of catalyst to flow out of the reactor via the said dump tube, then a second step of extracting the remainder of the catalyst, which is performed by sucking up the particles of catalyst remaining in the reactor at the end of the first step, using a flexible extraction sleeve introduced into the reactor via the said dump tube and connected to an extraction system situated outside the reactor, the said sleeve being provided on its external surface with protuberances and being able to move, inside the reactor, translationally and rotationally with respect to the said dump tube.

The method according to the invention makes it possible to empty the reactor of its charge of spent catalyst in a particularly complete, effective and rapid way.

The method according to the invention also makes it possible to avoid any human intervention inside the reactor, and allows a very significant improvement in the safety of the operations of dumping the spent catalyst.

The method according to the invention finally makes it possible to preserve the properties of the spent catalyst and limit the damage it sustains as it is dumped, something which is essential when the catalyst is then going to be regenerated with a view to subsequent reuse.

The first step in the method according to the invention is to cause a proportion of catalyst bed to flow out of the reactor through the dump tube, by opening the latter.

This first step is preferably performed under gravity, namely by causing a proportion of the bed of catalyst to flow under gravity out of the reactor via the said dump tube.

To "flow under gravity" means that the catalyst flows from the reactor during the first step under the action of its own weight and is neither driven by mechanical pushing means inside the reactor (for example by an operator), nor sucked from the reactor by particle extraction means.

This is typically a conventional gravity flow such as those known from the prior art.

The flow may also be assisted, which means to say that during the first step, means that facilitate the exiting of the catalyst from the reactor are employed, for example by injecting pressurized gas into the reactor.

Moreover, notably in cases in which catalyst flow does not occur spontaneously when the dump tube is opened, it is possible, immediately prior to the first step, to resort to means of deagglomerating the bed of catalyst. Such means are known from the prior art. They may in particular involve injecting pressurized gas (typically pressurized $CO_2$). These means make it possible to cause the particles of catalyst to begin to flow, after which the catalyst, in the case of gravity flow, is left to flow under the action of its own weight alone.

Thus, according to one embodiment of the invention, the said first step is preceded by a preliminary step of deagglomerating the catalyst, which is preferably performed by injecting a pressurized inert gas such as carbon dioxide or nitrogen into the bed of catalyst.

The present invention applies to reactors which are provided with at least one dump tube which opens into the reactor at the bottom part of the bed of particles or underneath this bed.

The dump tube may be horizontal, or inclined downwards. It is preferably inclined downwards. In that case, the dump tube preferably has an angle of inclination with respect to the vertical ranging from 0 to 75 degrees, more preferentially 10 to 60 degrees.

During the first step of the method according to the invention, a generally substantial proportion of the bed of spent catalyst is extracted from the reactor, typically more than 50 wt % of the initial bed, and in general ranging from 60 to 95 wt % of the initial bed of catalyst, more particularly from 70 to 90 wt % of the initial bed of catalyst.

The remainder of the catalyst (or "dig out") is then removed completely from the reactor by means of the second step of the method of the invention.

This second step uses a flexible extraction sleeve that is introduced over part of its length into the reactor via the dump tube once the first step is complete.

The end of the sleeve situated outside the reactor is connected to an extraction device which allows the remainder of the catalyst to be sucked up, the remainder entering the sleeve via that end thereof that is introduced into the reactor.

Thus, during this second step, the remainder of spent catalyst is completely sucked out of the bottom part of the catalyst bed, using the extraction sleeve according to the invention.

According to the present invention, the sleeve is able to move inside the reactor translationally and rotationally with respect to the said dump tube. That means that it can be thrust more or less deeply into the reactor using sleeve thrusting means, and that it can rotate on itself by virtue of sleeve rotating means.

For this purpose, means of guiding the sleeve are advantageously present outside the reactor to allow the said sleeve to be moved. Suitable guidance means consist for example of at least two motors, one allowing the sleeve to be moved translationally and the other rotationally with respect to the dump tube.

The means of guiding the sleeve may be fixed to the sleeve and/or to the reactor using an attachment system screwed to the dump tube.

These means of guidance may be controlled manually, automatically or semiautomatically.

When control of the means of guidance of the sleeve is manual, an operator outside the reactor controls the movements of the sleeve inside the reactor by operating these guide means.

When control of the means of guidance of the sleeve is automatic, the guide means are controlled by a computer which runs a program for moving the sleeve around inside the reactor. The movement program may be predefined, which means that the movements of the sleeve during the course of the second step have been calculated beforehand, so as to optimize the extraction of the "dig out". The movement program may also be designed in such a way as to organize a random movement of the sleeve inside the reactor.

Control of the means of guidance of the sleeve may also be semiautomatic, which means controlled in part by a computer program and in part by an operator.

Furthermore, according to one particularly advantageous embodiment of the invention, means of detecting the position of the sleeve are present inside the reactor. Such means make it possible at any moment to know the exact position of the sleeve inside the reactor, and, if appropriate, to optimize the movements thereof.

These detection means may comprise computation software which gradually determines the position of the sleeve in the reactor taking account of the movements performed (simulating the position of the apparatus using software that compiles the control data in order to deduce the position of the said sleeve).

Other detection means include for example radar detection or ultrasound detection systems; systems employing one or more accelerometers, one or more GPSs; viewing systems using one or more cameras.

According to a preferred embodiment, the said detection means comprise one or more camera(s) which allows(allow) the position of the sleeve in the reactor to be viewed. Such a camera may for example be positioned on the internal wall of the reactor and/or on the sleeve itself. Various types of camera can be used for this purpose, notably including night vision cameras and infrared cameras.

Such a camera may also make it possible if need be to locate the remainder of the catalyst, and to control the movements of the extraction sleeve accordingly.

The extraction sleeve used in the present invention is provided on its external surface with protuberances. These allow the sleeve to catch onto the surface of the remainder of the catalyst (dig out) and thus achieve lateral movements of the sleeve at the surface of this catalyst simply by rotating the sleeve, namely by making it rotate on itself: by virtue of the protuberances, the sleeve catches on the surface of the remainder of the catalyst and moves, rolling over this catalyst. The protuberances also allow the sleeve to scrape the surface of the remainder of the catalyst thereby making it easier to detach the catalyst and extract it using the end of the said sleeve.

These protuberances may have highly varying shapes. They may for example and nonlimitingly comprise splines, teeth of varying degrees of roundedness or, on the other hand, pointedness, brushes, or protuberances in the form of elongated cylindrical protruberances, studs, pins, spikes or nails.

They may be arranged uniformly or nonuniformly over the external surface of the extraction sleeve. They may be present over the entire length of the extraction sleeve introduced into the reactor or over part of this length, for example only at the suction head of the sleeve.

A "sleeve" denotes in a way known per se a hollow pipe. The sleeve according to the invention is flexible, which means deformable, and notably able to deform in bending. For that, the extraction sleeve is made of a deformable material such as a polymer material, for example a reinforced polymer, or a flexible metallic material.

According to one particularly advantageous embodiment, the end of the sleeve introduced into the reactor (namely the suction head of the sleeve) is curved, for example in the form of a "hook nose". Such a shape makes it easier to suck out particles of catalyst at the expense of the atmosphere in the reactor.

If the reactor comprises several beds of catalyst, each bed can be dumped using the method according to the invention. That entails there being on the reactor at least one dump tube at the bottom of each bed of catalyst.

When the spent catalyst to be removed from the reactor is reactive with the air, for example when it is of a self-heating nature, the method according to the present invention is typically performed by placing the reactor under an inert gas and then keeping it under that inert gas, that is to say that the catalyst removed from the reactor during the two steps according to the invention is progressively replaced with an inert gas, such as nitrogen for example. This introduction of inert gas into the reactor as the reactor is gradually emptied may be performed for example from the top or from the bottom of the reactor.

The present invention will now be illustrated in greater detail and nonlimitingly using the attached figures in which.

Figure 1:
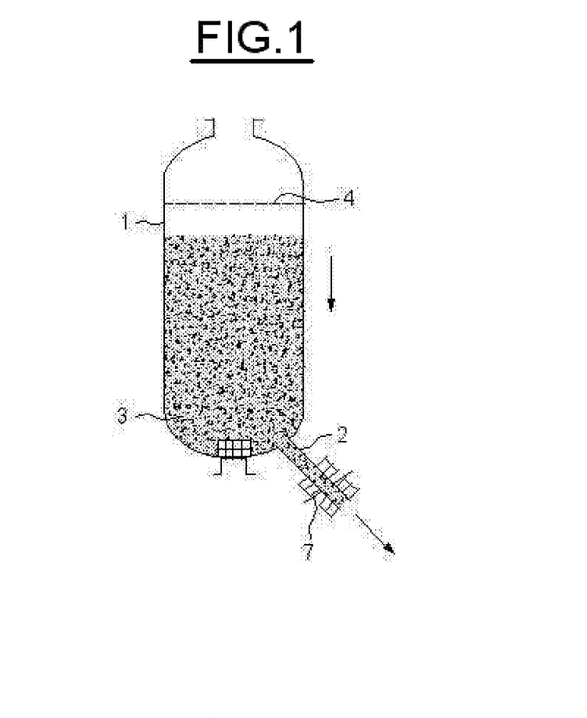
FIG. 1 illustrates implementation of the first step of the method according to the invention in an industrial reactor containing a bed of spent catalyst.

FIG. 1 shows an industrial reactor 1 of the columns type, containing a bed 3 of spent catalyst particles. The reactor 1 comprises a downwardly inclined dump tube 2, with an angle of inclination with respect to the vertical of around 45 degrees. The tube 2 opens into the reactor 1 at the bottom of the bed 3 of particles.

In order to allow the first step of the method according to the invention to be implemented, the dump tube 2 has been opened by opening the dump valve 7, so that the particles of catalyst flow out of the reactor 1 under gravity flow, via the tube 2.

The dotted lines 4 show the initial upper level of the bed of catalyst 3 before the gravity flow was initiated, and the arrows in FIG. 1 show the direction in which the catalyst flows.

Figure 2:
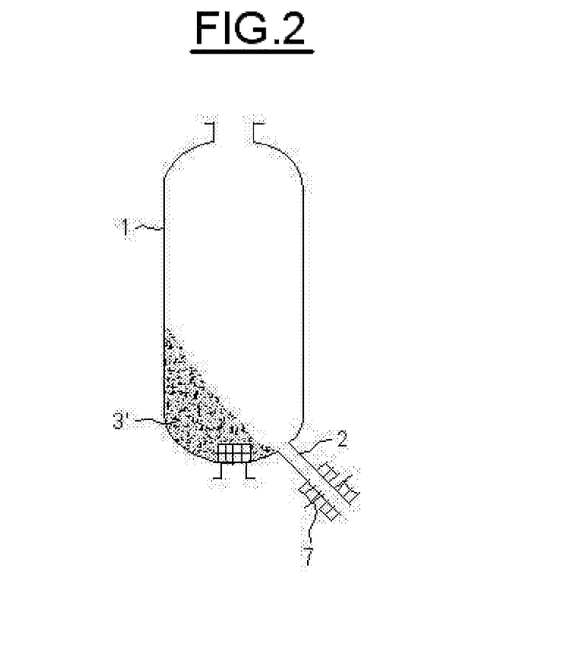
FIG. 2 shows the same reactor at the end of the first step.

FIG. 2 illustrates the same reactor 1 at the end of the first gravity flow emptying step, and shows that at the end of this step the reactor 1 still contains the remainder 3' of the spent catalyst which here represents approximately 15 wt % of the initial bed of catalyst, and which corresponds to the angle of repose of the mass of particles of catalyst. The remainder 3' of the catalyst corresponds to the "dig out" which cannot be removed simply under gravity flow emptying.

Figure 3:
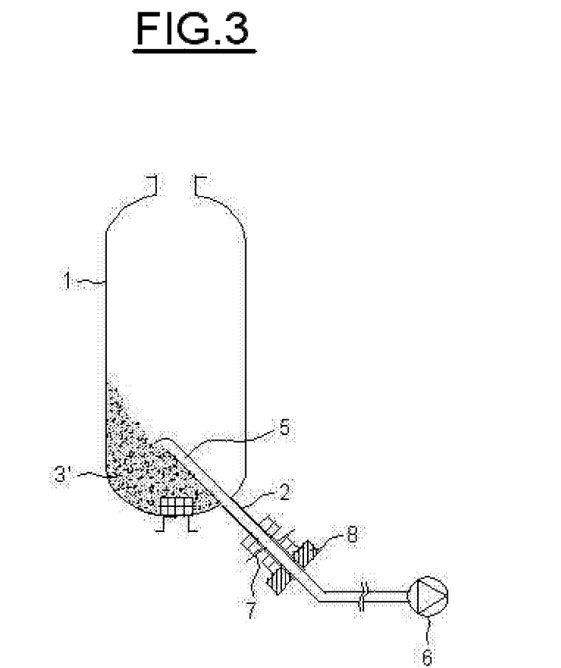
FIG. 3 illustrates implementation of the second step of the method according to the invention, in the same reactor.

As illustrated in FIG. 3, according to the second step in the method according to the invention, the remainder of the catalyst 3' is then sucked out of the reactor 1 using a flexible extraction sleeve 5 introduced into the reactor 1 via the dump tube 2. The end of the sleeve 5 introduced into the reactor, namely the suction head of the sleeve, is curved. The protuberances present at the surface of the sleeve 5 are not visible on the scale of FIG. 3, but may in particular be as described in FIGS. 4 to 7 below.

The sleeve 5 is connected to an extraction system 6 situated outside the reactor. In addition, the sleeve 5 is able to move translationally with respect to the axis of symmetry of the dump tube 2, and able to move rotationally with respect to this same axis. For that, a system 8 for the translational and rotational drive of the sleeve (for example a pair of motors) is fixed to the flange at the outlet of the dump tube 2.

FIGS. 4 to 7 illustrate nonlimiting examples of structures of protuberances that may be present at the surface of the extraction sleeve 5.

Figure 4A:
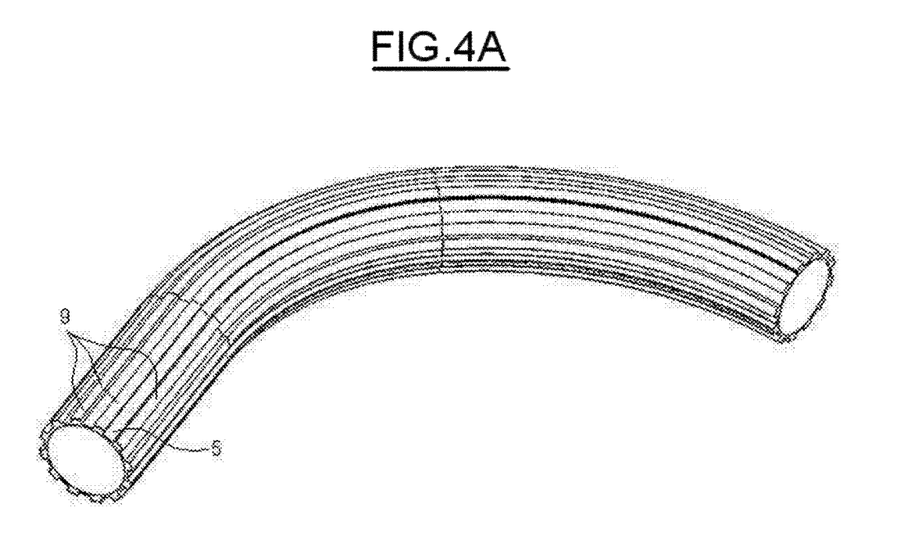
FIGS. 4 to 7 illustrate examples of structures of protuberances liable to be present at the surface of the extraction sleeve.
Figure 4B:
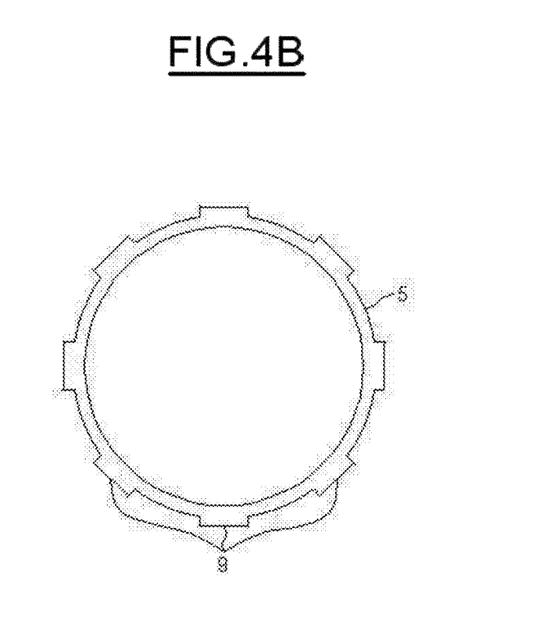

FIG. 4a shows an embodiment in which the sleeve 5 is provided on its external surface with splines 9. FIG. 4b shows a cross section of the sleeve 5.

Figure 5:
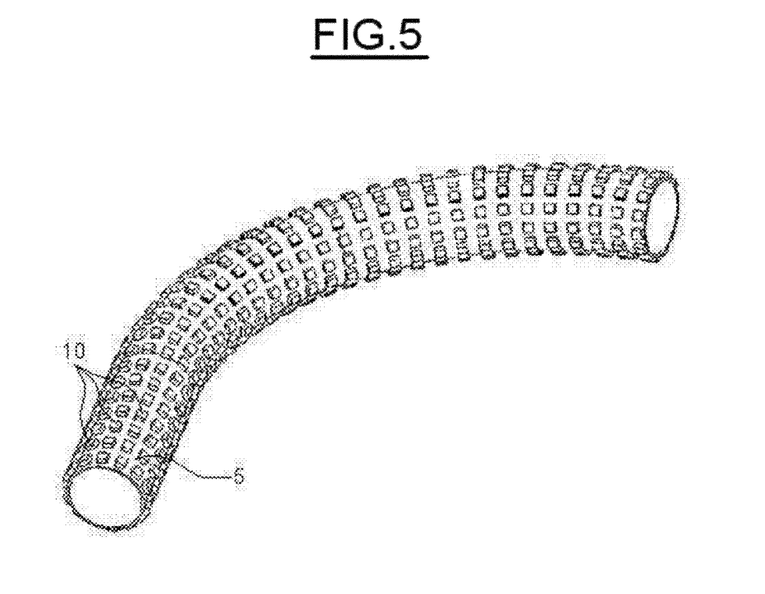

FIG. 5 shows an embodiment in which the sleeve 5 is provided on its external surface with a collection of knob-like lumps 10, for example uniformly arranged over the surface of the sleeve.

Figure 6:
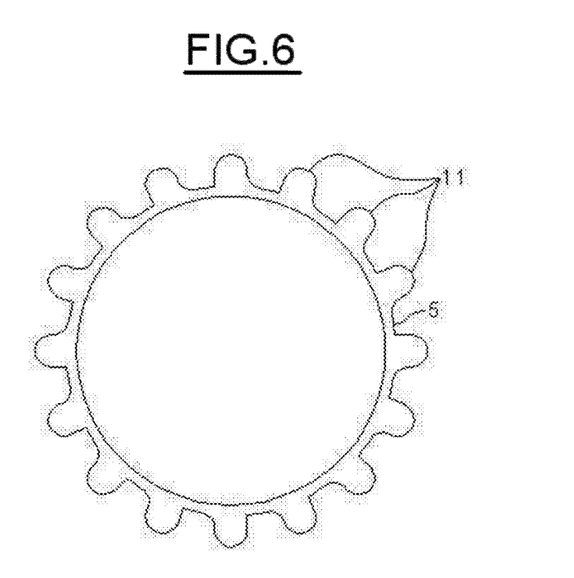

FIG. 6 shows a cross section through the sleeve 5 and illustrates one embodiment in which the sleeve 5 is provided on its external surface with teeth 11 of rounded shape, but which could also be pointed, or even hook-shaped.

Figure 7:
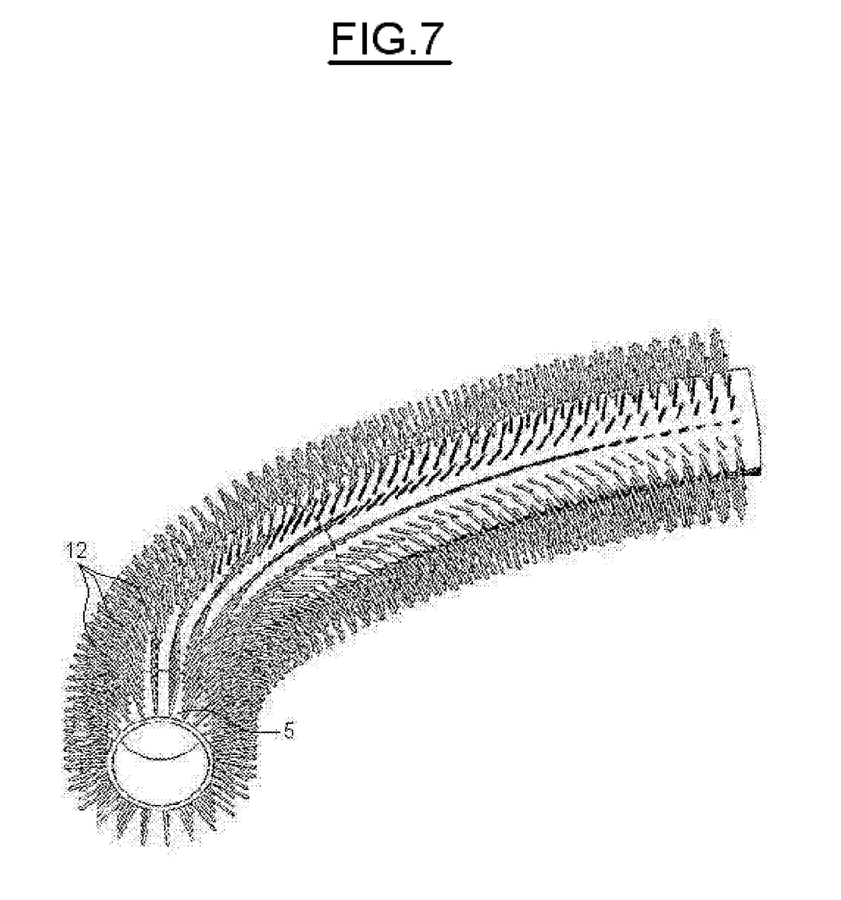

FIG. 7 shows an embodiment in which the sleeve 5 is provided on its external surface with a collection of protuberances 12 in the form of studs or pins uniformly arranged over the surface of the sleeve.

The invention claimed is:

1. A method for emptying a vertical reactor containing at least one bed of spent catalyst particles, wherein the vertical reactor comprises at least one dump tube that opens into the reactor at the bottom of the bed of particles or underneath the latter, the method comprising the steps of:

(a) causing a portion of the bed of spent catalyst particles to flow out of the reactor via the dump tube; and (b) extracting, without human manual intervention on the inside of the vertical reactor, the remainder of the spent catalyst particles from the reactor by sucking up the remainder of the spent catalyst particles with at least one flexible extraction sleeve introduced into the vertical reactor via the dump tube and connected to an extraction system situated outside the vertical reactor, the sleeve being provided on its external surface with protuberances and being able to move, inside the vertical reactor, translationally and rotationally with respect to the dump tube.

2. The method of claim 1, wherein step (a) is performed under gravity by causing a proportion of the bed of spent catalyst particles to flow out of the reactor under gravity via the dump tube.

3. The method of claim 1, wherein during the course of step (a), the proportion of the bed of spent catalyst particles extracted from the reactor is greater than 50 wt % of the initial bed.

4. The method of claim 3, wherein the portion of the bed of spent catalyst particles extracted from the reactor ranges from 60 to 95 wt % of the initial bed of catalyst particles.

5. The method of claim 3, wherein the portion of the bed of spent catalyst particles extracted from the reactor ranges from 70 to 90 wt % of the initial bed of catalyst particles.

6. The method of claim 1, wherein during the course of step (b), the sleeve is moved by guide means located outside the reactor.

7. The method of claim 6, wherein means of detecting the position of the sleeve are present inside the reactor.

8. The method of claim 7, wherein the detection means comprise one or more cameras positioned on an internal wall of the reactor and/or on the sleeve.

9. The method of claim 1, wherein the protuberances at the surface of the sleeve are selected from the group consisting of splines, teeth of varying degrees of roundedness or pointedness, brushes, elongated cylindrical protuberances, studs, pins, spikes and nails.

10. The method of claim 9, wherein the protuberances are present over the entire length of the extraction sleeve.

11. The method of claim 1, wherein the end of the sleeve introduced into the reactor is curved.

12. The method of claim 1, wherein the dump tube is horizontal or inclined downwards.

13. The method of claim 12, wherein the dump tube is inclined downwards, with an angle of inclination with respect to the vertical from 0 to 75 degrees.

14. The method claim 12, wherein the dump tube is inclined downwards, with an angle of inclination with respect to the vertical from 10 to 60 degrees.

15. The method of claim 1, further comprising, prior to step (a), deagglomerating the catalyst by injecting a pressurized inert gas into the bed of spent catalyst particles.

16. The method of claim 15, wherein the inert gas is carbon dioxide or nitrogen.

* * * * *